United States Patent
Ortega Rodriguez et al.

(10) Patent No.: US 7,836,470 B2
(45) Date of Patent: Nov. 16, 2010

(54) SYSTEM AND METHOD OF COMMON SYNCHRONISATION FOR BURSTS TRANSMITTED OVER AN UPLINK CONNECTION IN AN INTEGRATED MULTISPOT SATELLITE COMMUNICATION SYSTEM IN A MULTIMEDIA BROADCASTING NETWORK

(75) Inventors: Fernando Ortega Rodriguez, Madrid (ES); Maria Africa Rodriguez Martinez, Madrid (ES)

(73) Assignee: Alcatel, Paris (FR)

( * ) Notice: Subject to any disclaimer, the term of this patent is extended or adjusted under 35 U.S.C. 154(b) by 1425 days.

(21) Appl. No.: 09/986,555

(22) Filed: Nov. 9, 2001

(65) Prior Publication Data

US 2002/0087991 A1    Jul. 4, 2002

(30) Foreign Application Priority Data

Nov. 10, 2000    (ES)    ................................ 200002709

(51) Int. Cl.
*H04N 7/20* (2006.01)

(52) U.S. Cl. ............................... 725/63; 725/64; 725/65

(58) Field of Classification Search .................. 370/324
See application file for complete search history.

(56) References Cited

U.S. PATENT DOCUMENTS

| | | | | |
|---|---|---|---|---|
| 4,577,316 | A * | 3/1986 | Schiff ......................... | 370/324 |
| 6,067,453 | A * | 5/2000 | Adiwoso et al. ............. | 455/430 |
| 6,091,703 | A * | 7/2000 | Saunders et al. ............. | 370/210 |
| 6,188,684 | B1 * | 2/2001 | Setoyama et al. ........... | 370/352 |
| 6,301,308 | B1 * | 10/2001 | Rector ........................ | 375/270 |
| 6,400,696 | B1 * | 6/2002 | Hreha ......................... | 370/316 |
| 6,801,711 | B1 * | 10/2004 | Kim et al. ..................... | 386/69 |
| 6,836,658 | B1 * | 12/2004 | Sharon et al. ............... | 455/429 |

* cited by examiner

*Primary Examiner*—Christopher Kelley
*Assistant Examiner*—Justin E Shepard
(74) *Attorney, Agent, or Firm*—Sughrue Mion, PLLC

(57) ABSTRACT

System and method of common synchronisation for bursts transmitted over an uplink connection in an integrated multispot satellite communication system (S) in a multimedia broadcasting network for setting up bi-directional communication with a satellite with return channel. The common burst synchronisation (4) is produced in such a way that the transmission rate in the downlink direction (P2; U2; C2) from the satellite is a whole multiple of the network clock reference.

20 Claims, 2 Drawing Sheets

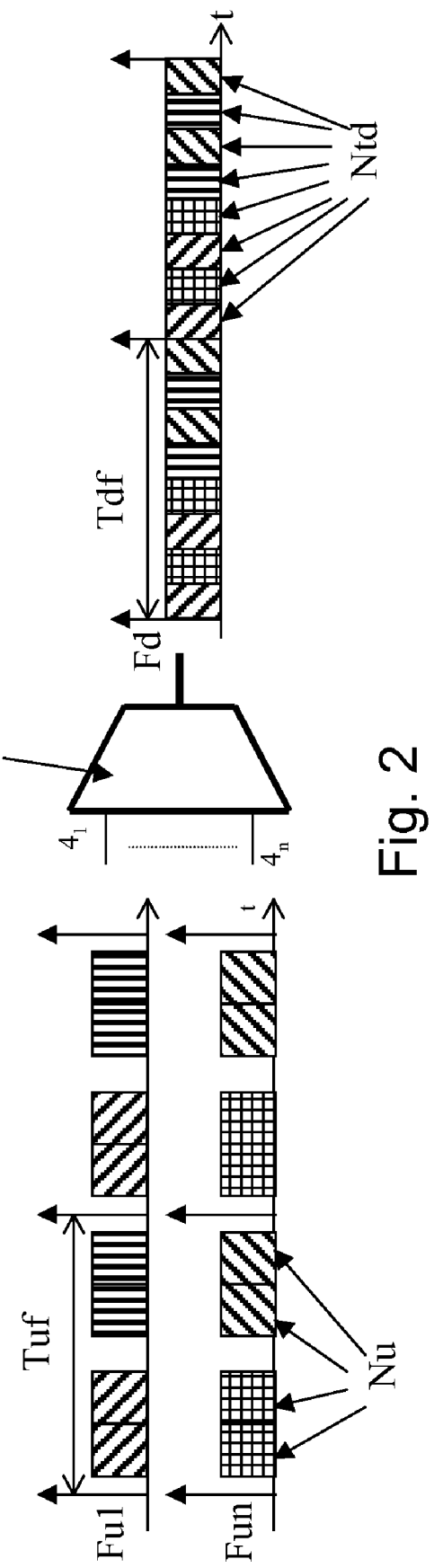

SYSTEM AND METHOD OF COMMON SYNCHRONISATION FOR BURSTS TRANSMITTED OVER AN UPLINK CONNECTION IN AN INTEGRATED MULTISPOT SATELLITE COMMUNICATION SYSTEM IN A MULTIMEDIA BROADCASTING NETWORK

The present invention relates to a system and a method of common synchronisation for bursts transmitted over an uplink connection in an integrated multispot satellite communication system in a multimedia broadcasting network, mainly in digital video broadcasting (DVB) applications that permit a user to request broadband interactive services employing standard stations both on the transmission and on the reception side. The invention proposes a single synchronisation that is common both for the interactive services and for the broadcast.

BACKGROUND OF THE INVENTION

The EN 300 421 standard of the ETSI (European Telecommunications Standards Institute) relates to DVB services over transparent satellite communication systems. The purpose of this standard is the provisioning of direct-to-user services known as DVB-S (digital video broadcasting via satellite), through an integrated receiver/decoder device that is located in his home. Its flexibility in multiplexing permits the use of a transmission capacity encompassing a variety of television (TV) service configurations, including sound and data services. All the components of said services are time division multiplexed (TDM) on a single carrier. The most detailed description of this standard can be found in the ETSI publication EN 300 421 V1.1.2 (1997-98) entitled: "Digital Video Broadcasting (DVB); Framing structure, channel coding and modulation for 11/12 GHz satellite services", the content of which is included in this patent application by reference.

Moreover, the ETSI standard known as DVB-RCS001 makes reference to interaction channels on a transparent satellite distribution system. The purpose of this standard is to provide basic specifications for the provision of interaction channels for interactive networks based on geostationary satellites (GEO) that incorporate fixed return channel satellite terminals (RCST). The service is also known as DVB-RCS (digital video broadcasting—return channel satellite). This standard facilitates the use of RCSTs for domestic installations both individual and collective types. Likewise, it supports the connection of said terminals with data networks at home, and can be applied to all the frequency bands allocated to GEO satellite services. The most detailed description of this standard can be found in the ETSI publication TM2267r3DVB-RCS001rev12 (Feb. 11, 2000) entitled: "Digital Video Broadcasting (DVB); Interaction Channel for Satellite Distribution Systems", the content of which is included in this patent application by reference.

These two standards are of the mono-spot type; that is, the satellite defines a single zone as coverage area. The mono-spot systems therefore present the drawback that, by having limited coverage areas, they are not suitable for more extensive areas on a worldwide scale. The services related with each of said standards are presently employed in a mutually independent form.

The steadily growing user demand for interactive services makes it necessary for the satellite communication systems to support broadcasting with return channel to the end users when the latter may be scattered over entirely different and dislike regions of the world, and thereby facilitate better access and faster interconnection between them. This, in turn, makes it necessary the provision of systems capable of broadcasting on networks that support multimedia having multispot communication characteristic.

The service that DVB-S provides, although offering the possibility of direct communication to the user's home, has the drawback of not having foreseen the possibility of including a return channel in order that the user may communicate with the multimedia service provider. On the other hand, the service furnished through DVB-RCS, whilst providing said return channel, does not include the possibility of direct communication with the user's home for broadcast applications.

In the light of the foregoing, it has become necessary to facilitate an integrated multispot satellite communication system on a multimedia broadcasting network capable of supporting digital video broadcasting (DVB) applications in order to facilitate multimedia services directly to the user's home and permitting at the same time that said user can establish communication with the multimedia service provider over a return channel.

One solution to this problem, proposed by this same applicant, has been to offer the users a multimedia broadcasting service such that the user can communicate with the multimedia service provider via a return channel to the satellite, all of this in a substantially economical manner.

Said solution proposed the combined use of the standardised DVB-S and DVB-RCS services, thereby obtaining a single, regenerative and multispot, satellite system permitting the use of standard stations both on the transmission and on the reception side. With this solution, both the end user and the multimedia service provider employ a return channel according to the DVB-RCS standard via an uplink channel to the satellite.

On board the satellite the regenerative payload performs the multiplexing of the information coming from diverse sources into a data stream suitable for being received by a user who has available any standard integrated receiver/decoder equipment.

Moreover, according to the ETSI standard DVB-RCS001 (draft EN 301 790 V1.1.1.) relative to the interaction channels in satellite systems, the synchronisation of the bursts transmitted by the return channel satellite terminal (RCST) is carried out by receiving information on a network clock reference (NCR) inside the standard packets termed MPEG2-TS (Motion Picture Expert Group 2-Transport Stream), sent by a network control centre in DVB-S format. The RCST reconstructs the original 27 MHz reference of the network control centre, permitting it to transmit the return information in burst mode in an allocated time slot.

As has already been mentioned, the mutually independent and transparent use of the two broadcasting and interaction services performed in a conventional manner makes it unnecessary to have synchronisation of the bursts in transmission of the programs offered to the users, thus the RCST could strictly employ the DVB-RCS standard.

However, on combining the two services, DVB-S and DVB-RCS, that is when using an integrated broadcast and interaction system as has been mentioned above, it is assumed that the RCSTs used by the broadcast provider shall be the same as those used by the users. For this purpose it is necessary to define a burst synchronisation method that is common both for the interactive services and for broadcasting, and consequently permits the use of the same type of RCST on the service provider side and on the user side.

DESCRIPTION OF THE INVENTION

To overcome the problems outlined above the method and system of common synchronisation for burst transmitted over an uplink connection in an integrated multispot satellite communication system in a multimedia broadcasting network, objects of the present invention, are proposed.

One of the components on board the satellites is a DVB regenerative multiplexer. Since said DVB regenerative multiplexer endeavours to use synchronised schemes for inserting different uplink channels—from both the service provider and the user—into a single DVB-S downlink signal, it is proposed, by means of the solution of the invention, to create a simple relationship between the reference frequency generated by the clock in the network control centre and the reference frequency of the satellite.

It is further proposed that the clock reference of the actual satellite be employed to generate clock references for the network.

Thus, an object of the invention is to provide an integrated multispot satellite communication system in a multimedia broadcasting network with return channel characterised in that it comprises common synchronisation means for the bursts, in such a manner that the transmission rate in a downlink direction from the satellite is a whole multiple of a clock reference of said network.

According to one aspect of the invention, the integrated multispot communication system includes a satellite suitable for generating said clock reference of the network.

Another object of the invention is to provide a multiplexer to be included in the satellite of the invention.

According to another aspect of the invention, the multiplexer is suitable for fitting in synchronous fashion different uplink channels into a downlink signal, in such a manner that a period of the downlink frame is equal to a period of the uplink frame.

Another additional object of the invention is to provide a method of common synchronisation of the bursts transmitted over an uplink connection in an integrated multispot satellite communication system in a multimedia broadcasting network with return channel characterised in that said synchronisation of the bursts is common for a provider of multimedia services and a user, and is carried out in such a manner that the transmission rate in a downlink direction is a whole multiple of a clock reference of the network.

According to another additional aspect of the invention, the method comprises the generation of said clock reference of the network in a satellite of said system.

These and other characteristics of the invention are described in greater detail hereunder with the assistance of the drawings attached hereto.

BRIEF DESCRIPTION OF THE DRAWINGS

FIG. 2 is an illustration of a synchronous multiplexing scheme with various frequencies in the uplink direction and one frequency in the downlink direction.

DESCRIPTION OF A PREFERRED EMBODIMENT

Figure 1:
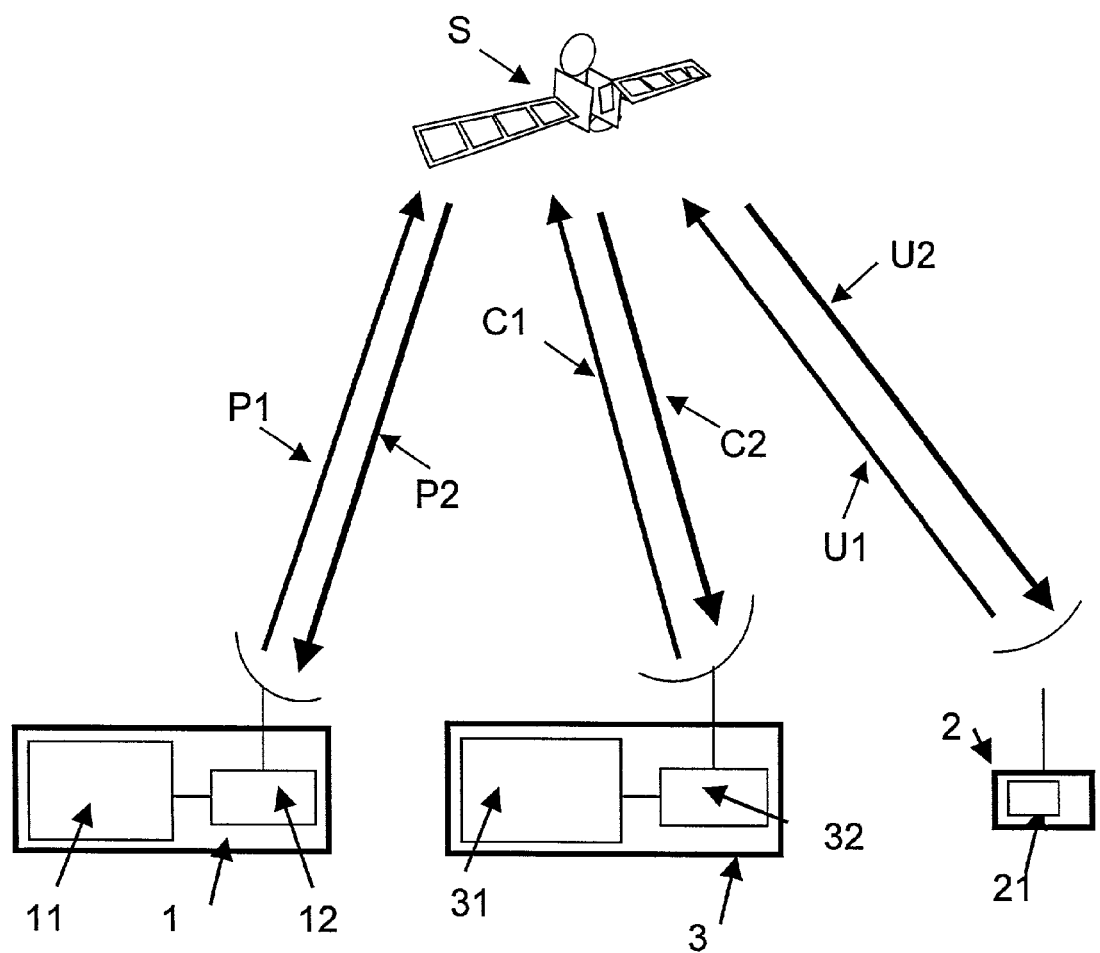
FIG. 1 is a schematic diagram of a multispot satellite communication system in a multimedia broadcasting network, according to the present invention.

To provide a better understanding of the scenario in which it is intended to implement the invention, a brief description is to be found hereunder of an example of an integrated system of broadcasting and interaction network making reference to FIG. 1.

According to a typical scenario of this system, a multimedia services provider 1 in a DVB system sends multimedia service signals, as for example video on demand, to a user 2 via a satellite S. The provider 1 comprises, among other components necessary for its operation, a broadcast signal producing means 11 and a return channel satellite terminal (RCST) 12. The provider sends the broadcast signal P1, which incorporates the multimedia channel, to the user 2 via the satellite S. This signal also contains information concerning the return signalling that serves for accessing and synchronising to the interactive network. The signal P1 is therefore an uplink signal of the type of signals that comply with the aforementioned DVB-RCS standard.

A network controller means 3 serves to control and administer the network functions. In addition it is capable of transmitting information directly to the satellite regarding signalling and timing for the network operation from a signal generator 31, employing the same DVB-RCS standard mode; at the same time it is capable of receiving the different return channels coming from the multimedia services provider and from the user, which the satellite S transmits to it by means of DVB-S signals. The signalling is to be understood as including all network control operations, as for example network access request, authentication, synchronisation, etc. The direct signalling is that sent from the controller means 3, and the return signalling corresponds to the signal sent by the user 2 and/or the provider 1. Consequently, the signalling part of the signal P1 is addressed to the controller means 3.

The controller means also comprises a return channel satellite terminal 32 in order to receive said DVB-S return signals.

The satellite S can be, preferentially, of the multispot type whereby it may have a multiple coverage zone, whereby various users 2 can request, individually, broadband multimedia service independently of where they are located, provided that they are within the coverage zone of the multispot satellite S. In FIG. 1 only one user 2 is shown for reasons of simplification, it being understood that there can exist various users in communication with the satellite S.

With this arrangement the user 2 requests, via a signal U1, a predetermined multimedia service from provider 1. Said signal is sent to the satellite S and contains the return channel to the provider 1 and return signalling to the control centre 3, both in DVB-RCS format. The satellite S serves to transmit the request to the service provider 1 by means of a signal P2 of the DVB-S type that contains the return channel of the user 2 and the signalling of the controller means 3. Said signal P2 is received by the return channel satellite terminal 12 and is then processed in a conventional manner in order to attend the request of the user 2.

The control operations for sending the signals U1 and P2, as well as the verification of user identity and profile, are carried out in the controller means 3 through the interchange of signals C2 in DVB-S format and C1 in DVB-RCS format. The signal C1 serves for sending signalling to the provider 1 and/or to the user 2, and the signal C2 serves for receiving the return signalling from the provider 1 and/or from the user 2. These signals shall have to pass through the return channel satellite terminal 32 in a bi-directional manner. Assuming that the user is identified and his profile is approved for receiving the service requested, the provider 1 sends the broadcast signal P1 to the satellite. This signal is sent in DVB-RCS format. Once received in the satellite this signal, together with other possible uplink signals received from this same or other broadcast sources are multiplexed in a multiplexer, to obtain a signal in DVB-S format in the form of a data stream suitable for being received by any integrated receiver/decoder equipment. The multiplexing is performed by means of a regenerator means on board the satellite. Said regenerator, as well as carrying out the multiplexing, is capable of performing functions of cross-connecting and/or broadcasting channels to different coverage zones.

The user 2 receives the multimedia channel from the provider 1 and the signalling from the controller means 3, both in DVB-S format. The user 2 has installed in his home a return channel satellite terminal (RCST), thus he has the facility for communicating over a return channel with said satellite S and via the aforementioned signal U1 that, by being in DVB-RCS format, permits this operation. In this way, all the signals received in the satellite S from the users are multiplexed in the same multiplexer. Once multiplexed, the satellite S sends the output signal to the provider 1 via the signal P2 that is in DVB-S format.

The operation of the RCST comprises the transmission in multi-frequency mode in time division multiple access, that is MF-TDMA, of bursts that contain MPEG2-TS packets following an uplink frame structure just as described in the DVB-RCS standard.

This implies that the duration of the uplink frame contains a whole number of cycles, in this case of 27 MHz, of the network clock reference (NCR). Thus:

$$Tuf = Nu/Riu = K/27 \text{ MHz} \quad (1)$$

where:
Tuf is the period of the uplink frame in µs;
Nu is the information of the MPEG2-TS packets within an uplink frame in bits;
Riu is the uplink information transmission rate in Mbit/s; and
K is a whole number that represents the number of NCR cycles in an uplink frame.

Furthermore, the on-board DVB multiplexer maps various uplink signals into a downlink data stream of the time division multiplexed type, that is TDM, compatible with the DVB-S standard, making use of a synchronous scheme, which leads to the following relationship:

$$Nu/Riu = Ntd/(CVR*RS*Rtd)$$

where:
Ntd is the information in the MPEG2-TS packets, expressed in bits and mapped into a downlink frame;
CVR is the ratio of the convolutional code selected for the downlink DVB-S signal, which can take the values of 1/2, 2/3, 3/4, 5/6 or 7/8 defined in the DVB-S standard;
RS is the ratio of the Reed-Solomon code for the MPEG2-TS packets, which is equal to 188/204; and
Rtd is the downlink transmission rate including convolutional and Reed-Solomon coding in Mbit/s.

Since Ntd, that is the number of bits transmitted, depends on the convolutional code ratio (CVR) selected and RS in the DVB-S standard is fixed, it results in the expression Ntd/(CVR*RS) being a constant value that could be termed Nd. Therefore:

$$Nu/Riu = Nd/Rtd = Tdf \quad (2)$$

Thus Nd/Rtd can provide a period of the downlink frame, Tdf, which coincides with the period of the uplink frame, Tuf, in expression (1).

Based on this conclusion, reference is now made to FIG. 2, in which a synchronous multiplexing scheme can be observed, in which Fu1 to Fun are different carrier frequencies employed in the uplink access and Fd is the frequency employed in the downlink direction. From equations (1) and (2) the following can be deduced:

$$Nd/Rtd = K/27 \text{ MHz}$$

and consequently:

$$Rtd = (Nd/K)*27 \text{ MHz} \quad (3)$$

If the ratio Nd/K is chosen in such a manner that it represents a whole number, for example M, then:

$$Rtd = M*27 \text{ MHz}$$

Depending on the bandwidth (BW) of the transmitter on board the satellite, M can have different values. In the table below, some examples of said values are shown, as well as the resulting downlink signalling rate.

| BW | M | Rtd |
|---|---|---|
| 36 MHz | 2 | 54 Mbit/s |
| 54 MHz | 3 | 81 Mbit/s |
| 72 MHz | 4 | 108 Mbit/s |

Moreover, the use of a downlink signalling rate that is a multiple of 27 MHz permits the satellite clock to be used as frequency generator for the network clock reference (NCR), whereby a substantial simplification is achieved in the synchronisation of the DVB repeater on board the satellite with the subsequent saving in costs.

In FIG. 2, it can be seen that the carrier frequencies Fu1 and Fun represent an uplink transmission frame period Tuf that at each frequency contains a determined number of information packets Nu, which in the case of the example of this figure is 4. These packets, after processing in demultiplexing, demodulation, decoding and descrambling stages, not shown in the figure for simplification, are applied to a multiplexer means 4, with n inputs 4₁ to 4$_n$ and one output frequency Fd for the downlink signal. Given that the downlink frame period Tdf is the same as that of the uplink frame, said multiplexer 4 can employ a synchronous scheme for fitting the uplink packets into a downlink signal by using a downlink transmission rate Rtd that is a multiple of the network clock reference frequency. The result is a number of downlink packets Ntd fitted into the downlink frame as illustrated in the figure.

Thanks to the solution proposed by the invention, the following significant advantages are obtained:
The method of the invention permits, both the user and the provider of the multimedia service, to use the burst synchronisation scheme defined in the DVB-RCS standard.
It likewise permits the on-board DVB multiplexer to utilise synchronous multiplexing, which is substantially simpler than asynchronous multiplexing.
The generation of the clock frequency on board the satellite is simplified through the use of a single reference frequency both for synchronisation with the interactive network and for generating the downlink signal.

Likewise it permits the network clock reference (NCR) frequency to be generated on board the satellite, whereby the synchronisation of the equipment on board with the interactive network is substantially simplified.

The invention claimed is:

1. Integrated multispot satellite communication system in a multimedia broadcasting network with a return channel, comprising:
   a satellite that receives a multimedia broadcast signal from a provider and transmits said multimedia broadcast signal to a user in response to a request from said user;
   common means of burst synchronisation such that the transmission rate in a downlink direction from the satellite is a whole multiple of a clock reference of said network; and
   a network controller that receives different return channels from said user and said provider, via said satellite, wherein a signalling part of said multimedia broadcast signal is addressed from said provider to said network controller,
   wherein different uplink channels from a service provider and a user are inserted into a downlink signal in a synchronous manner, such that a period of the downlink frame is equal to a period of the uplink frame.

2. The system according to claim 1, wherein said satellite is configured to generate said network clock reference.

3. The system of claim 2, further comprising a multiplexer.

4. The system according to claim 3, characterised in that said multiplexer inserts in the synchronous manner the different uplink channels from the service provider and the user into the downlink signal.

5. The system of claim 1, wherein said system is configured to communicate in accordance with digital video broadcasting-return channel system (DVB-RCS).

6. The system of claim 1, wherein said downlink direction transmission rate is one of 54 Mbit/s, 81 Mbit/s and 108 Mbit/s.

7. The system of claim 1, wherein a bandwidth of a transmitter onboard said satellite is a multiple of 27 MHz.

8. The system of claim 1, further comprising:
   a regenerator, positioned on said satellite, that performs multiplexing and at least one of cross-connecting and broadcasting channels to different coverage zones, wherein said network controller performs control operations and verifies at least one of an identity and a profile of said user.

9. The system of claim 1, wherein said request from said user comprises a request for video on demand service.

10. The system of claim 1, wherein said synchronous manner comprises an on-board DVB multiplexer that maps uplink signals into a downlink data stream compatible with the downlink digital video broadcasting via satellite (DVB-S) standard, based on the following relationship:

$$Nu/Riu = Ntd/(CVR*RS*Rtd),$$

wherein:
Tuf=Nu/Riu=K/27 MHz is a period of the uplink frame in microseconds;
Nu is information of Moving Picture Experts Group 2-Transport System (MPEG2-TS) packets within the uplink frame in bits;
Riu is an uplink information transmission rate in Mbit/s;
K is a whole number that represents a number of network clock reference (NCR) cycles in the uplink frame;
Ntd is information in the MPEG 2-TS packets, expressed in bits and mapped into the downlink frame;
CVR is a ratio of convolutional code selected for the downlink digital video broadcasting via satellite (DVB-S) signal, having a value that comprises 1/2, 2/3, 3/4, 5/6 or 7/8 as defined in the DVB-S standard;
RS is a ratio of Reed-Solomon code for the MPEG2-TS packets, and equal to 188/204; and
Rtd is a downlink transmission rate including the convolutional code and Reed-Solomon code in Mbit/s.

11. Method of burst synchronisation in an integrated multispot satellite communication system in a multimedia broadcasting network with return channel, comprising:
   a network controller receiving different return channels from a user and a provider, via a satellite, wherein a signalling part of a multimedia broadcast signal from said provider to said user, in response to a user request, is addressed from said provider to said network controller,
   wherein said synchronisation is common for a multimedia services provider and a user, in such a manner that the transmission rate in a downlink direction is a whole multiple of a network clock reference,
   wherein different uplink channels are inserted into a downlink signal in a synchronous manner, such that a period of the downlink frame is equal to a period of the uplink frame.

12. The method according to claim 11, comprising generating said network clock reference in said satellite of said system.

13. The method of claim 11, wherein said satellite uses a multiplexer to perform said synchronization.

14. The method of claim 13, wherein said multiplexer synchronously fits the different uplink channels into the downlink signal.

15. The method of claim 11, wherein method comprises communicating in accordance with digital video broadcasting-return channel system (DVB-RCS).

16. The method of claim 11, wherein said downlink direction transmission rate is one of 54 Mbit/s, 81 Mbit/s and 108 Mbit/s.

17. The method of claim 11, wherein a transmitter onboard said satellite operates at a bandwidth that is a multiple of 27 MHz.

18. The method of claim 11, further comprising performing multiplexing and at least one of cross-connecting and broadcasting channels to different coverage zones, by a regenerator positioned on said satellite, wherein said network controller performs control operations and verifies at least one of an identity and a profile of said user.

19. The method of claim 11, wherein said request comprises a request for video on demand service.

20. The method of claim 11, wherein said synchronous manner comprises an on-board DVB multiplexer that maps uplink signals into a downlink data stream compatible with the downlink digital video broadcasting via satellite (DVB-S) standard, based on the following relationship:

$$Nu/Riu = Ntd/(CVR*RS*Rtd),$$

wherein:

$T_{uf} = N_u/R_{iu} = K/27$ MHz is a period of the uplink frame in microseconds;

$N_u$ is information of Moving Picture Experts Group 2-Transport System (MPEG2-TS) packets within the uplink frame in bits;

$R_{iu}$ is an uplink information transmission rate in Mbit/s;

K is a whole number that represents a number of network clock reference (NCR) cycles in the uplink frame;

$N_{td}$ is information in the MPEG2-TS packets, expressed in bits and mapped into the downlink frame;

CVR is a ratio of convolutional code selected for the downlink digital video broadcasting via satellite (DVB-S) signal, having a value that comprises 1/2, 2/3, 3/4, 5/6 or 7/8 as defined in the DVB-S standard;

RS is a ratio of Reed-Solomon code for the MPEG2-TS packets, and equal to 188/204; and $R_{td}$ is a downlink transmission rate including the convolutional code and Reed-Solomon code in Mbit/s.

\* \* \* \* \*